United States Patent [19]

Withiam Michael C.

[11] Patent Number: 4,842,772
[45] Date of Patent: Jun. 27, 1989

[54] FIRE RETARDANT PIGMENT

[75] Inventor: Withiam Michael C., Elkton, Md.

[73] Assignee: J. M. Huber Corporation, Rumson, N.J.

[21] Appl. No.: 56,464

[22] Filed: Jun. 1, 1987

[51] Int. Cl.⁴ .................. C09K 21/00; D06P 5/00; B05D 3/02; B32B 9/04

[52] U.S. Cl. .................. 252/601; 162/159; 8/116.1; 8/490; 106/18.12; 106/38.3; 106/84; 252/602; 252/607; 252/609; 427/397.8; 428/452; 428/453; 428/920; 428/921; 521/906; 521/907

[58] Field of Search ............... 252/601, 602, 607, 608, 252/609; 106/38.3, 74, 77, 288 R, 76, 104, 288 B, 306, 308 B, 18.11, 18.12, 84, 286.5, 286.8, 287.1, 287.17; 423/111, 115, 117, 118, 119, 121; 428/452, 453, 920, 921; 524/450, 575.5; 427/397.7, 397.8; 8/490, 625

[56] References Cited

U.S. PATENT DOCUMENTS

| 3,403,041 | 9/1968 | Lyons et al. | 106/288 |
|---|---|---|---|
| 3,582,379 | 6/1971 | Hackbarth et al. | 106/288 B |
| 3,832,327 | 8/1974 | Hackbarth et al. | 106/288 B |
| 3,928,057 | 12/1975 | DeColibus | 106/300 |
| 4,001,128 | 1/1977 | Penneck | 174/110 SR |
| 4,062,693 | 12/1987 | Berger | 106/308 Q |
| 4,144,081 | 3/1979 | Van der Heem | 106/15.05 |
| 4,175,162 | 11/1979 | DeBoel et al. | 428/920 |
| 4,178,273 | 12/1979 | Brown | 428/421 |
| 4,212,909 | 7/1980 | Brown | 428/421 |
| 4,267,089 | 5/1981 | Brown | 428/522 |
| 4,358,500 | 11/1982 | George et al. | 428/354 |
| 4,375,493 | 3/1983 | George et al. | 428/354 |
| 4,572,862 | 2/1986 | Ellis | 428/920 |
| 4,584,330 | 4/1986 | Wason | 523/513 |
| 4,600,634 | 7/1986 | Langer | 428/220 |

Primary Examiner—Howard J. Locker
Attorney, Agent, or Firm—Harold H. Flanders; Alec H. Horn; Robert L. Price

[57] ABSTRACT

Alumina trihydrate particles coated with alkali metal silicate, alkaline earth metal silicate or alumino silicate are useful as fillers in paper and plastics and provide good opacity and brightness properties as well as fire retardancy. The alumina trihydrate products are prepared by reaction of alumina trihydrate with an alkali metal silicate, an alkaline earth metal silicate, or alumino silicate, or the reaction of alkali metal silicate or alkaline earth metal silicate with aluminum sulfate to produce an alumino silicate precipitate coating in situ.

16 Claims, 1 Drawing Sheet

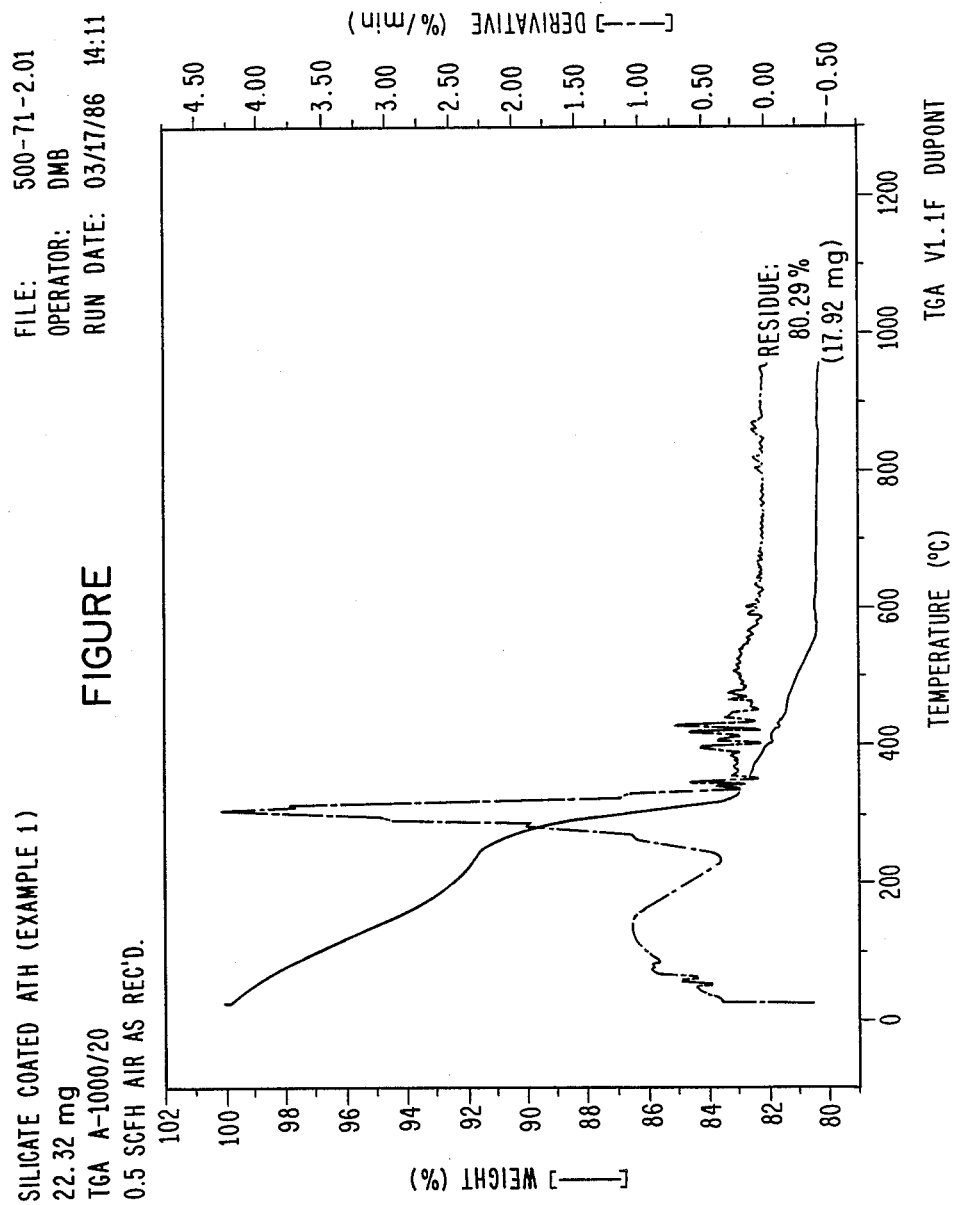

4,842,772

FIRE RETARDANT PIGMENT

FIELD OF THE INVENTION

This invention relates to the production of a modified alumina trihydrate which exhibits a high brightness and opacity and exhibits the reinforcing properties and fire retardant properties of alumina trihydrate.

BACKGROUND

Aluminan trihydrate ($Al_2O_3.3H_2O$) also known as hydrated alumina or ATH, occurs naturally as the mineral gibbsite or hydrargyllite. It is also obtained directly from auxite by the Bayer process which involves the treatment of bauxite with alkali under pressure. The well known fire retardant properties stem from the release of the water of hydration. Water is liberated beginning at about 230° C. with complete dehydration at about 600° C. The dehydration reaction is endothermic and therefore will exhibit a cooling effect in compositions. The water vapor given off also dilutes combustion gases which may be present during a fire to help arrest combustion.

While it is known to use alumina trihydrate as a filler in particulate form in plastics, papers, and the like, normally an additional agent is required to enhance the properties of the mixture. For example, in U.S. Pat. No. 4,062,693, alumina trihydrate is incorporated as a filler in glass fiber reinforced plastics. However, in order to avoid a viscosity build up derived from the inclusion of the inorganic oxide, an organic silane compound is used as a coupling agent. The organic silane compounds used are blended with the alumina trihydrate and the treated alumina trihydrate then is incorporated in the plastic composition with the result that viscosity buildup is not exhibited. The flame retardant properties however are preserved.

Similarly, in U.S. Pat. No. 4,001,128, a plastic composition is described which is useful as insulation in high voltage electrical apparatus. The plastic or rubber substrate is filled with alumina trihydrate. The porosity normally expected however is eliminated by also including an inorganic silicon-containing compound treated with an organic silane compound. The additive was found to reduce porosity which could result during the shaping operation if the composition is heated to the point that the alumina trihydrate starts to lose some of its water of hydration.

It is also known to use alumina trihydrate as a filler in fibrous compositions including fiber blankets such as fiberglass and aluminosiicate fibers or combinations thereof. In U.S. Pat. No. 4,600,634, such fiber blankets are filled with alumina trihydrate in major concentrations, but an organic binding agent must be used to bind the particulate alumina trihydrate to the ceramic aluminosilicate fibers.

It is also known to use alumina trihydrate as an ingredient in paints, papers and the like. Pigments used therein must maintain a high degree of brightness and opacity. It is also known to use naturally occurring alumina silicate compounds as pigments in such compositions. For example in U.S. Pat. No. 3,403,041, kaolin particles are used. In that patent it was discovered that it was not necessary to calcine such particles at a temperature of 1000° C. if delaminated particles were used. However, when such delaminated kaolin was used, and when heated only to about 800° C., the particles tended to agglomerate. In that patent it was discovered that the addition of a small amount (7% to 10%) of alumina trihydrate eliminated this undesirable agglomeration.

SUMMARY OF THE INVENTION

It has now been discovered however that alumina trihydrate pigments can be modified to provide improved opacifing and brightening properties without calcining, while retaining the reinforcing and fire retardant properties of alumina trihydrate. These pigments can be produced from grades of alumina trihydrate which do not have the initial required brightness. This invention involves the discovery that a synthetic silicate pigment containing alumina trihydrate can be produced by precipitating an alkali metal or alkaline earth metal silicate or an alumino silicate onto the surface of particles of alumina trihydrate. The resulting pigment has been found to yield increased opacity while maintaining a high degree of brightness along with the fire retardant properties and may be incorporated directly in plastics, paper and the like where fire retardancy is desirable.

Accordingly it is an object of this invention to provide a modified alumina trihydrate pigment which is inherently fire retardant.

It is another object of this invention to provide a synthetic silicate or alumino silicate pigment wherein a synthetic silicate compound is precipitated directly onto the alumina trihydrate particles.

BRIEF DESCRIPTION OF THE DRAWING

These and other objects of the invention will become apparent with reference to the drawing and following description wherein:

The FIGURE is a thermal gravimetric analysis of a composition of this invention.

In satisfaction of the foregoing objects and advantages, the present invention provides a method for the production of alumina trihydrate particles having coated thereon a alkali metal or alkaline earth-metal silicate, an alkali metal alumino silicate, an alkaline-earth metal alumino silicate or an alkali metal--alkaline-earth metal alumino silicate, the resulting alumina trihydrate having excellent fire retardant properties, the method comprising the steps of:

reacting predetermined quantities of aqueous solutions, one aqueous solution containing an alkali metal and/or alkaline earth metal silicate; a second solution containing a compound or compounds that will result in the precipitation of the alumino silicate, mixing the solutions in the presence of finely divided alumina trihydrate, said solutions being reacted with agitation until a precipitate of alumina trihydrate coated with alkali metal alumino silicate, alkaline-earth metal alumino silicate or alkaline earth metal-alkali metal alumino silicate, is formed, and the coated alumina trihydrate is then separated and recovered from the slurry.

In a preferred procedure, the one solution contains predetermined quantities of an aqueous solution of an alkali metal or alkaline-earth metal silicate. This is combined with a soluble metal salt, such as, aluminum sulfate. These compounds are reacted to form the alumino silicate in situ in the presence of finely divided alumina trihydrate with agitation. The precipitate of the alkali metal or alkaline-earth metal alumino silicate on the alumina trihydrate is separated and recovered from the slurry.

In another preferred procedure, the one solution contains predetermined quantities of an aqueous solution of an alkali metal silicate. Another solution contains predetermined quantities of an aqueous solution of an alkaline earth metal hydroxide and an alkali metal sulfate. These are combined with a soluble metal salt such as aluminum sulfate. These compounds are reacted to form the alumino silicate in situ in the presence of finely divided alumina trihydrate with agitation. The precipitate of alkaline earth metal-alkali metal alumino silicate or the alumina trihydrate is then separated and recovered from the slurry.

The present invention also provides an alumina trihydrate product having precipitated on the surfaces thereof a synthetic silicate. This invention is intended, as noted above, to include as a synthetic silicate precipitate an alkali metal silicate, an alkaline earth metal silicate, an alkali metal alumino silicate, an alkaline earth metal alumino silicate, and an alkaline earth metal-alkali metal alumino silicate.

Also provided by the present invention are plastics and paper filled with alumina trihydrate which has precipitated on the surfaces thereof an alkali metal silicate, or alkaline-earth metal silicate, or alumino silicate.

DESCRIPTION OF THE PREFERRED EMBODIMENTS

It has been discovered according to this invention that a specific binding agent is not necessary in order to combine a synthetic silicate pigment with alumina trihydrate. According to this invention, the silicate pigment is precipitated directly into the alumina trihydrate particles in an aqueous slurry. The precipitate is then recovered from the slurry, washed salt free, dried and milled. The pigment then is formed without a binding agent, and without calcining and exhibits the required brightness and opacity as well as exhibiting the reinforcing and fire retardant properties of alumina trihydrate.

In the method of the present invention, the novel product is prepared by the reaction of alumina trihydrate with an alkali metal silicate, an alkaline-earth metal siliate, or alumino silicate. The synthetic silicate is preferably sodium alumino silicate or magnesium sodium alumino silicate. The reaction is preferably carried out in an aqueous medium at temperatures ranging from about 40° C. to 100° C. In a preferred embodiment of the invention, however an alkali metal or alkaline-earth metal alumino silicate is prepared by the in situ reaction of an alkali metal or alkaline earth metal silicate with aluminum sulfate in preparation of the final product. It has been found that the reaction of the alkali metal silicate or alkaline earth metal silicate and the aluminum sulfate, with the alumina trihydrate present, results in the precipitation of an alkali metal or alkaline earth metal alumino silicate pigment onto the alumina trihydrate particles.

During precipitation of this pigment, particles of the alumina trihydrate become entrapped within the particles of the synthetic silicate pigment precipitate. This results in an alumina trihydrate product which is coated with a synthetic silicate in intimate relationship. This resulting product is a material of high brightness and is a finely divided pigment having excellent fire retardant and other characteristics.

It will be appreciated with respect to the product of the invention that it is an alumina trihydrate material containing a coating of an alkali metal or alkaline earth metal alumino silicate. In a preferred embodiment however the alumino silicate is produced in situ by reaction of aluminum sulfate with an alkali metal silicate or alkaline-earth metal silicate. In the most preferred embodiment, alumina trihydrate is reacted with sodium silicate and aluminum sulfate to precipitate sodium alumino silicate in situ. In another most preferred embodiment sodium sulfate, magnesium hydroxide, sodium silicate and aluminium sulfate are reacted in the presence of alumina trihydrate to precipitate magnesium sodium alumino silicate in situ.

The resulting product is characterized by excellent brightness and opacity and also exhibits excellent reinforcing and fire retardant characteristics. It is therefore useful as a filler for paper, plastics as for example polyvinyl chloride, polyethylene and the like, and may be characterized as being a high brightness finely divided pigment. A suitable amount of the filler in paper and plastics is about 2% to 10% and about 2% to 50% by weight, respectively.

The following example utilizes sodium as the alkali metal. However as will be obvious to those skilled in the art equivalent molar quantities of calcium, magnesium, potassium, or the like could be substituted therefore. In this example and throughout the specification, parts are by weight unless otherwise indicated.

EXAMPLE I

A typical batch of pigment is prepared as follows:

A slurry of alumina trihydrate is prepared in the ratio of 200 grams of alumina trihydrate to 1550 grams of water. The slurry is maintained at a temperature of about 60° C.

To this slurry is added 1581.35 grams of sodium siliate solution containing 8.9% $Na_2O$ and 22.39% $SiO_2$. The sodium silicate solution is added simultaneously with 911.62 grams of aluminum sulfate solution containing 27.64% $Al_2(SO_4)_3$. Sufficient agitation is maintained in the slurry to suspend the alumina trihydrate particles. The reaction of the sodium silicate and aluminum sulfate in the presence of alumina trihydrate results in the precipitation of sodium aluminosilicate pigment directly on particles of alumina trihydrate.

The resulting pigment particles are then recovered from the slurry, washed salt free, dried, and milled. The silicate reaction above is essentially that described in U.S. Pat. Nos. 2,739,073; 3,582,379 and 3,832,327, and the disclosures thereof are hereby incorporated by reference.

EXAMPLE II

A typical batch is prepared by adding 4000 g of aluminum trihydrate (ATH) to 15067 g of $H_2O$ containing 1811.15g of $Na_2SO_4$ andn 66.65 g $Mg(OH)_2$. To this mixture 20156.50 g of sodium silicate solution containing 8.69% $Na_2O$ and 22.39% $SiO_2$ is added simultaneously with 4273.50 g of aluminum sulfate solution containing 27.64% $Al_2(SO_4)_3$. Additions are made over a 40 minute period of time maintaining sufficient agitation to both suspend the ATH particles and provide adequate disperion of the incoming reactants. The reactions result in an alumina substrate (ATH) being coated with a magnesium sodium alumino silicate. The slurry is then aged, the coated ATH recovered, washed salt free, dried and milled to yield a finely divided pigment. While magnesium is used herein it will be obvious to those skilled in the art that equimolar quantities of any alkaline earth metal such as calcium could be substituted. The silicate reaction of this Example is essentially that described in U.S. Pat. Nos. 3,798,046 and RE 30,568 and the disclosures thereof are hereby incorporated by reference.

With attention to the drawing the FIGURE shown therein is a thermal gravimetric analysis of the silicate coated ATH of Example I. As shown therein, degradation of the hydrated alumina substrate has not been affected by the surface precipitate thereon.

Tests were conducted on the products of Example I and Example II to evaluate properties of the compositions of this invention. The tests set forth below were standard TAPPI methods for evaluating opacity (UM 411) and brightness (T452 0577). With attention to Table I a low brightness grade of hydrated alumina (SB-30 or C-30 type) is compared with a coated ATH as prepared according to Example I, and with a commercial paper grade of hydrated alumina. Hand sheets were produced using the indicated pigments in a single filler sheet to maximize the relative differences in sheet brightness and opacity. As can be seen in Table I, coated ATH of this invention performs substantially better in opacifying and also better in brightening the sheet than the commercial paper grade hydrated alumina.

TABLE I
STANDARD FINE PAPER PERFORMANCE

| Sample | % Filler | TAPPI Opacity | TAPPI Brightness |
|---|---|---|---|
| | Unfilled | 78.7 | 85.8 |
| Milled | 3 | 79.2 | 86.1 |
| Uncoated ATH | 6 | 79.5 | 86.3 |
| | 9 | 79.7 | 86.4 |
| Coated ATH | 3 | 80.6 | 86.6 |
| Example I | 6 | 81.8 | 87.1 |
| | 9 | 82.5 | 87.4 |
| Commercial Paper | 3 | 79.8 | 86.4 |
| Grade Hydrated Alumina | 6 | 80.4 | 86.8 |
| | 9 | 80.8 | 87.0 |

Note:
The hydrated alumina used as an uncoated control and utilized as the substrate in Example I is an unbleached C-30 type ATH.

In Table II below, two batches of coated ATH pigment containing two levels (25% and 50%) of ATH substrate of this invention were produced and tested. The batches were produced in accordance with Example II. In this case a smaller average particle size hydrated alumina was used as the substrate.

Even when filled with a pigment containing a level of 50% ATH the performance of a single filler fine paper sheet was found to be far superior to the sheet filled with commercial hydrated alumina in both opacifying power and brightness.

TABLE II

| Sample | % Filler | TAPPI Opacity | TAPPI Brightness |
|---|---|---|---|
| | Unfilled | 78.7 | 85.8 |
| Uncoated ATH | 3 | 80.9 | 86.7 |
| | 6 | 82.3 | 87.5 |
| | 9 | 83.1 | 87.9 |
| Coated ATH | 3 | 83.0 | 87.5 |
| (25% ATH) | 6 | 85.9 | 88.5 |
| | 9 | 87.6 | 89.2 |
| Coated ATH | 3 | 82.4 | 87.3 |
| (50% ATH) | 6 | 84.7 | 88.3 |
| | 9 | 86.2 | 88.9 |
| Commercial Paper | 3 | 79.8 | 86.4 |
| Grade Hydrated | 6 | 80.4 | 86.8 |
| Alumina | 9 | 80.8 | 87.0 |

Note:
The hydrated alumina used as an uncoated control and utilized as the substrate for the coated pigments is a high brightness small particle size ATH.

This process thus produces pigments exhibiting high brightness even from lower grades of alumina trihydrate.

In summary, a synthetic silicate coated alumina trihydrate can be produced by directly precipitating particles of alkali metal silicates, alkaline earth metal silicates, alkali metal alumino silicates alkaline earth metal alumino silicates or alkaline earth metal-alkali metal alumino silicates onto the alumina trihydrate in a water slurry. It has been found that only agitation is necessary, high temperatures are not needed, and a specific binding agent is not necessary. The resulting pigment combines the desirable properties of both compounds and is useful as a filler directly in papers, plastics and the like using conventional procedures to formulate such compositions.

The invention may be embodied in other specific forms without departing from the spirit or essential characteristics thereto. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An uncalcined pigment composition having high opacity, brightness and reinforcing and fire-retardant characteristics, consisting essentially of
   finely divided alumina trihydrate particles having coated thereon a synthetic silicate selected from the group consisting of alkali metal silicates, alkaline earth metal silicates, alkali metal alumino silicates, alkaline earth metal alumino silicates and alkaline earth metal-alkali metal alumino silicates, wherein the alumina trihydrate particles are entrapped within particles of the synthetic silicate so as to be coated with the synthetic silicate in intimate relationship.

2. The pigment composition of claim 1, wherein the trihydrate is a low grade alumina trihydrate.

3. The pigment composition of claim 1, wherein the trihydrate is unbleached alumina trihydrate.

4. The pigment composition of claim 1, substantially lacking a binder.

5. The pigment composition of claim 1, wherein the synthetic silicate comprises sodium alumino silicate.

6. The pigment composition of claim 1, wherein the synthetic silicate comprises magnesium sodium alumino silicate.

7. The pigment composition of claim 1 obtained by a process comprising
   mixing finely divided alumina trihydrate particles with a synthetic silicate selected from the group consisting of alkali metal silicates, alkaline earth metal silicates, alkali metal alumino silicates, alkaline earth metal alumino silicates, and alkaline earth metalalkali metal alumino silicates to form a slurry;
   precipitating the synthetic silicate onto the trihydrate particles by agitating the slurry under conditions effective to coat the trihydrate with said silicate and obtain a finely divided pigment composition; and
   separating said pigment composition from the slurry.

8. The pigment composition of claim 7, wherein the process further comprises forming said synthetic silicate in situ by reacting aluminum sulfate with a silicate selected from the group consisting of alkali metal silicates and alkaline earth metal silicates.

9. A plastic comprising a plastic-filling amount of the pigment composition of claim 1.

10. The plastic of claim 9, wherein
the pigment composition is present in an amount of about 2 to 50 wt % of the plastic.

11. A paper comprising a paper-filling amount of the pigment composition of claim 1.

12. The paper of claim 11, wherein
the pigment composition is present in an amount of about 2 to 10 wt % of the paper.

13. A process for preparing the uncalcined pigment composition of claim 1, comprising
mixing finely divided alumina trihydrate particles with a synthetic silicate selected from the group consisting of alkali metal silicates, alkaline earth metal silicates, metal alumino silicates, and alkaline earth metal-alkali alkali metal alumino silicates, alkaline earth metal alumino silicates to form a slurry;
precipitating the synthetic silicate onto the trihydrate particles by agitating the slurry under conditions effective to coat the trihydrate with said silicate and obtain a finely divided pigment composition; and
separating the pigment composition from the slurry.

14. The process of claim 13, further comprising
forming the synthetic silicate in situ by reacting aluminum sulfate with a silicate selected from the group consisting of alkali and alkaline earth metal silicates.

15. The process of claim 13, wherein
the precipitation step is conducted in an aqueous medium at a temperature of about 40° to 100° C.

16. The process of claim 13, further comprising
washing the separated pigment composition; drying the washed pigment composition; and milling the dried pigment composition to a desired particle size.

* * * * *